United States Patent Office 3,535,270
Patented Oct. 20, 1970

3,535,270
CATALYST COMPOSITE CONTAINING SILICA
AND A NOBLE METAL COMPONENT
Bernard F. Mulaskey, Pinole, Calif., assignor to Chevron Research Company, San Francisco, Calif., a corporation of Delaware
No Drawing. Continuation-in-part of application Ser. No. 430,497, Feb. 4, 1965, which is a continuation-in-part of application Ser. No. 286,004, June 6, 1963. This application Nov. 24, 1967, Ser. No. 685,307
The portion of the term of the patent subsequent to July 1, 1986, has been disclaimed
Int. Cl. B01j 11/74, 11/78
U.S. Cl. 252—439
5 Claims

ABSTRACT OF THE DISCLOSURE

This invention relates to a catalyst composite containing silica, at least one other metal oxide, and a minor amount of a noble metal, or sulfide thereof, said catalyst being particularly suitable for use in the hydrocracking of petroleum fractions.

RELATED APPLICATIONS

This application is a continuation-in-part of my co-pending application Ser. No. 430,497, filed Feb. 4, 1965, now abandoned, which in turn was a continuation-in-part of my application Ser. No. 286,004, filed June 6, 1963, now abandoned.

USE OF CATALYST OF PRESENT INVENTION

Although the catalyst described herein is capable of catalyzing such reactions as hydrogenation, isomerization, and dealkylation, it is particularly suitable for use as a hydrocracking catalyst. As used in the petroleum refining industry, hydrocracking describes a process wherein petroleum feedstocks or fractions are converted to more valuable lower boiling products by a reaction involving the consumption of added hydrogen at elevated temperatures and pressures in the presence of a reaction promoting catalyst. Because of the particular utility of the present catalyst in hydrocracking operations, the catalyst will be described in connection with such a reaction, but its utility is not so limited.

PRIOR ART

One line of hydrocracking development disclosed in the patent literature has been the use of catalysts employing platinum and palladium metals disposed, as by impregnation, on acidic, silica-containing supports, e.g., silica-alumina composites having cracking activities. Representative of such patent disclosures is U.S. Pat. 2,945,806 (Ciapetta). This patent describes a process for hydrocracking relatively high boiling hydrocarbon fractions, in the presence of added hydrogen, by contact, at a temperature of from about 400° to 825° F., a hydrogen pressure of from about 100 to 2500 p.s.i.g. and a liquid hourly space velocity (LHSV) of from about 0.1 to 10, with a catalyst that includes between 0.05% and 20% by weight, of a platinum or palladium series metal deposited upon a synthetic composite (of defined cracking activity) containing silica and at least one other metal oxide, e.g., alumina, zirconia, thoria.

Several disadvantages of such a typical process (and catalyst) exist. The first, and quite obvious, is that with the amount of platinum or palladium series metal necessary as a hydrogenation-dehydrogenation component of the catalyst, the cost of the catalyst is appreciable, reflected in the market price of such metals. A second disadvantage is that both the platinum and palladium series metals are extremely active hydrogenation components. Due to this high activity, hydrocracking with such catalysts involves a high hydrogen consumption, an economic consideration of major importance when designing a hydrocracking plant since large quantities of hydrogen must be furnished to the system, the source of which increases the capital expenditure and continuing cost of operating the hydrocracking complex to a considerable extent. Further, as a result of this excessive hydrogenation, the product streams from the hydrocracking zone are highly saturated as indicated by the high aniline points of these recovered products. In the case of hydrocracking plants directed primarily to the production of such middle distillates as jet fuel, stove oils and the like, this is not a particular problem except for the excessive hydrogen consumption situation. However, if the hydrocracking operation is directed to the production of gasoline, the hydrogenation reaction reduces the product octane number, particularly due to the hydrogenation of high octane number aromatic hydrocarbons to the corresponding lower octane number naphthenes. The latter can, of course, be subsequently subjected to a catalytic reforming operation where such naphthenes will be dehydrogenated again to aromatics, but this is, on the face of it, an expensive sequence of multiple operations.

CATALYST OF PRESENT INVENTION

I have found that the both of these problems can be appreciably alleviated by the catalyst of the present invention. Further, these improvements can be had without a sacrifice of the hydrocracking activity of the prior art catalysts and, in some cases, the present catalyst possesses an even higher activity than previous noble metal catalysts. These improvements have been made possible by the discovery that smaller amounts of platinum or palladium than heretofore considered the absolute minimum can be used in catalysts comprising a hydrogenating component selected from the group consisting of platinum, platinum sulfide, palladium and palladium sulfide, and further comprising silica and at least one other metal oxide, and that the resulting catalyst nevertheless is superior, provided that the catalyst is prepared by coprecipitation or cogelation of the hydrogenating and the cracking components thereof, and that the silica content of the catalyst is in the range 50 to 90 weight percent, based on the entire catalyst.

Accordingly, the present invention is directed to a catalyst, suitable, for example, for the hydrocracking of hydrocarbon fractions, comprising over 0.01 and less than 0.05 weight percent (of the entire catalyst) of a hydrogenating component selected from the group consisting of platinum, platinum sulfide, palladium and palladium sulfide associated with a catalytically active siliceous cracking component containing 50 to 90 weight percent silica, based on the entire catalyst, said catalyst having been prepared by cogelation or coprecipitation of the hydrogenating and cracking components thereof.

The cracking component of the catalyst must possess isomerization or cracking activity. Such activity is almost universally dependent upon the metal oxide components being acidic in character and this normally requires a combination of at least two metal oxides, since a considerable number of oxides do not, by themselves, exhibit the necessary cracking activity but do so when combined. For example, silica alone does not, but when it is combined with alumina, magnesia, or the like, the combination is highly active with respect to cracking and isomerization. For this reason, the desired active cracking activity of the present catalyst is obtained by combining silica with one or more of the following: alumina, magnesia, zirconia, titania, thoria, hafnia, ceria, or samaria, with a silica-alumina combination preferred. The silica content of the catalyst must be in the range of from about 50 to 90 percent. The remainder of the catalyst will be made up of one or more of the other enumerated metal oxides coupled, of course, with the minor amount of platinum and/or palladium set forth herein. The siliceous support may comprise a synthetic alumino-silicate ("molecular sieve"). If desired, the catalyst can be further activated, in a conventional manner, for example by use of various forms of fluorides.

Coprecipitation of the catalyst components can be accomplished by forming a basic mixture of a soluble silicate or a silica sol, a soluble salt (or sol) of the other metal component, and a soluble compound of platinum and/or palladium, and then coprecipitating the mixture by the addition of an acid. Likewise, coprecipitation can be done in the reverse manner, e.g., by forming an acidic mixture of solutions and/or sols of the components, and thereafter coprecipitating by adding a base. In either case, the coprecipitate can be recovered by filtration or the like, washed, dried and calcined. If alkali metals are employed in preparing the coprecipitates, it is highly desirable to ion exchange out the alkali metal by contact with, for example, an ammonium salt such as the acetate, the ammonium ions replacing the alkali metal ions. Upon calcination, the ammonium ions will be decomposed and removed from the composite.

Cogelation of the catalyst components can be accomplished by forming a mixture of a soluble silicate or silica sol, a soluble salt or sol of the other metal component, and a soluble compound of the particular noble metal desired in the final catalyst, and then adding an epoxide, for example, an oxirane containing from 2 to 3 carbon atoms per molecule, to form a hydrogel. The latter can then be treated, if necessary, in the same manner as the coprecipitated composite, i.e., alkali metal removal if present, drying and calcining.

The catalyst of the present invention has a high surface area, in contrast to certain prior art catalysts prepared by forming the cracking component, treating the cracking component to reduce the surface area thereof, and then adding a hydrogenating component.

The catalyst of the present invention can be further activated, if desired, by including a fluorine-containing compound in the original mixture before coprecipitation or cogelation, or the catalyst may be fluorided after it is prepared. In some cases it may be desirable to include in the catalyst structure particles of synthetic aluminosilicates ("molecular sieves"). Thus, small particles of the sieve material, preferably pre-ion exchanged to increase their cracking activity, can be included in the mixtures of solutions or sols before they are precipitated or otherwise formed into hydrogels.

The final catalyst composite is dried and calcined. Drying can be done by conventional methods, such as by evaporation of the water and/or solvents. This initial drying step can be done at relatively low temperatures, for example, from about 100° to 500° F. The calcining step can be acomplished by heating, generally in the presence of an oxygen-containing gas, from about 500° to 1000° F. under atmospheric pressure. Other calcining methods are known to those familiar with catalyst manufacturing techniques. In some situations, particularly when the silica content of the catalyst is relatively low in comparison with the content of the other metal oxide (e.g. alumina), it is often desirable to thermactivate the composite, thermactivation being done by heating the composite, under essentially dry conditions, to a temperature in the range of from about 1200° to 1600° F. for a period of from about 0.25 to 48 hours. This thermactivation (heat treating) step has been found to enhance the activity of the final catalyst, particularly those containing platinum.

The catalyst may be sulfided in a conventional manner, either before being placed in a reactor for use, or in situ in the reactor.

ACTIVITY TEST FOR DETERMINING HYDROCRACKING ACTIVITY OF CATALYST OF PRESENT INVENTION AND COMPARISON CATALYSTS

The hydrocracking activity of the catalyst of the present invention and of comparison conventional catalysts, is referred to in the examples herein. The hydrocracking activity of any particular catalyst can be best shown by a standard test from which the "activity index" of the catalyst can be determined and which can be used to effectively compare various catalysts. The differences in activity index levels between catalysts are highly significant, particularly because the relationship between activity index and conversion is not linear. For example, a catalyst having an activity index of 14 has been found to hydrocrack a particular cracked cycle oil feed under specific conditions of temperature, pressure, and feed space rate to produces boiling below the initial boiling point of the feed at a per-pass conversion of 20 volume percent. Under identical conditions and with the same feed, catalysts with activity indices of 21 and 28 gave per-pass conversion of 49 and 56 volume percent, respectively. The nonlinearity is shown by the fact that doubling the activity index (from 14 to 28) actually almost tripled the per-pass conversion (20 to 56 volume percent). Thus, it can be seen that what may appear to be a nominal increase in the activity index is, in fact, one of considerable importance, the difference being not merely one of degree but of kind.

The test to determine the activity index of the catalyst broadly involves a determination of the conversion of a selected hydrocarbon feedstock to products falling below the initial boiling point of said stock under defined operating conditions. The feedstock employed is a catalytic cycle oil recovered as a distillate fraction from the effluent of a fluid-type of catalyst cracking unit, containing less than 5 p.p.m. basic nitrogen. The specific test feed employed in obtaining the activity index values of all catalysts in Examples 1–5 herein was obtained from a fluid catalytic cracking unit being charged with a mixture of light and heavy gas oils cut from a predominantly California Valley crude. The feed was hydrofined to produce the actual test stock which had the following inspections.

TABLE I.—INSPECTIONS OF HYDROFINED CYCLE OIL TEST SAMPLE

| | |
|---|---|
| Gravity, ° API | 29.2 |
| Aniline point, ° F. | 100.2 |
| Nitrogen (basic), p.p.m. | 0.3 |
| Aromatics, vol. percent | 46 |
| Naphthenes, vol. percent | 36 |
| Paraffins, vol. percent | 18 |
| ASTM distillation (D–158), ° F.: | |
| Start | 362 |
| 5% | 441 |
| 10% | 453 |
| 30% | 481 |
| 50% | 500 |
| 70% | 523 |
| 90% | 560 |
| 95% | 577 |
| End point | 624 |

The equipment employed in determining the activity index of the catalyst was a conventional continuous feed pilot unit, operated once-through with hydrocarbon feed and hydrogen gas. It consisted of a cylindrical reaction chamber operated downflow with a preheating section, followed by a section containing the catalyst under test, and enclosed in a temperature-controlled metal block to permit controlled temperature operation, together with the necessary appurtenances, such as feed burettes, feed pump, hydrogen supply, condenser, high pressure separator provided with means for sampling the gas and liquid phases, back pressure regulators and thermocouples. For accuracy in hydrogen feed, hydrogen was compressed into a hydrogen accumulator or burette whence it was fed to the reactor by displacement with oil fed at at a constant rate from a reservoir by means of a pump.

In testing a catalyst to determine its activity index, the oil test stock, along with 12,000 s.c.f. of hydrogen per barrel of feed, is first passed for 14 hours through a mass of catalyst at a liquid hourly space velocity of 2 and at a catalyst temperature of 570° F. The catalyst temperature is then reduced to 540° F., and the feed passed through for another 14 hours at the same rate. Samples of the products are collected at about 2-hour intervals during the minimum period of 28 hours on-stream. These samples are allowed to flash off light hydrocarbons at ambient temperature and pressure, following which a determination is made of the API gravity of each sample. The aniline point of the samples is also determined when it is desired to obtain an indication of the relative tendency of the particular catalyst to hydrogenate aromatics present in the feed. The individual API gravity values are then plotted and a smooth curve is drawn from which an average value may be obtained. Samples collected at the end of the eighth hour of operation at the 540° F. temperature are usually regarded as representative of steady-state operating conditions and may be distilled to determine conversion to product boiling below the initial boiling point of the feed. This conversion under steady test conditions is a true measure of the activity of the catalyst. However, the API gravity of the product sample or samples minus the API gravity of the feed, is a rapid and convenient method of characterizing the catalyst which correlates smoothly with conversion. For convenience, the foregoing API gravity rise is referred to as the activity index of the catalyst.

While reference has been made above to the use of a particular catalytic cycle stock in connection with determining the activity index of the catalyst, it has been found that similar activity index values can be obtained with catalytic cycle stocks obtained from other than California crudes. While the use of such other test feeds may give different absolute values than those described herein, such differences are without influence on conclusions reached relating to catalyst activity inasmuch as the test stock is serving primarily as a relative standard by which to judge the conversion activities of various catalysts.

It will be noted that the activity index determination described above is conducted at a catalyst temperature of 540° F., although a somewhat higher temperature is employed prior to the actual test. However, this temperature can be altered to best show the acivity of various catalysts. This alteration is not done during the actual determination but is kept constant while sampling. Since the activity index is based upon feed conversion, it can be seen that too high a reaction temperature could result in 100% conversions and too low a temperature result in conversions so low that comparison would be difficult. With the catalysts herein described, reaction temperatures during the actual test determination were maintained at 540° F. However, it must be understood that the same catalyst would have a different activity index at different catalyst temperatures.

EXAMPLES

The following examples will indicate the advantages of the present catalyst composition.

Example 1 (Catalyst A)

A palladium catalyst was produced as follows:
An intimate mixture comprising a silica sol, aluminum chloride and palladium chloride was first formed. The silica sol was produced by hydrolyzing $Si(OC_2H_5)_4$ in a methyl alcohol-water solution containing a small amount of 0.5 N HCl. Sufficient water and alcohol were employed so as to prevent the formation of a two phase system. To this sol was added a mixture of $AlCl_3 \cdot 6H_2O$, $PdCl_2 \cdot 2H_2O$, methyl alcohol and water. The resulting mixture used the following quantities of components.

| | | |
|---|---|---|
| $PdCl_2 \cdot 2H_2O$ | gm | 0.24 |
| $AlCl_3 \cdot 6H_2O$ | gm | 378.88 |
| $Si(OC_2H_5)_4$ | ml | 1189 |
| $CH_3OH$ | ml | 604 |
| $H_2O$ | ml | 480 |
| HCl | ml | 5 |

To the chilled mixture was then added 494 ml. of propene oxide and the mixture stirred. After a period of about three minutes, a hydrogel was formed. The latter was allowed to stand about two hours, was then oven-dried at about 250° F. for about 12 hours, and was then calcined at 1000° F. in a muffle furnace for two hours. This produced a gel (exerogel) having a composition (in weight percent) of 20% alumina, 0.03% palladium (calculated as the metal although it existed as palladium oxide), with the remainder silica.

The xerogel was then inserted in a reaction zone and contacted with flowing hydrogen at a temperature of 520° F. and at total pressure of 1200 p.s.i.g. so as to reduce the palladium oxide. A mixture containing 10 volume percent ethyl mercaptan in mixed hexanes was then passed into the reaction zone along with the hydrogen for a period of four hours. This step substantially sulfided the palladium metal. The sulfiding was done to prevent temperature runaways during the activity test determination. During this test, the sulfur on the catalyst was rapidly stripped therefrom under the reaction conditions employed, thereby providing a palladium metal catalyst during the effective on-stream period of the test.

The activity index of this catalyst was then determined in the manner described above, the catalyst temperature during the sampling being 540° F. The activity index was found to be greater than 28. The aniline point of the product sample was about 124° F.

To further show the effectiveness of this catalyst, particularly with respect to its resistance to fouling by feed components, the catalyst was utilized in another hydrocracking operation. The feed was almost identical to that employed in the activity test determination. The reaction was conducted at a total pressure of 1200 p.s.i.g., in the presence of hydrogen entering the system at a rate of 9200 s.c.f./b. (standard cubic feet per barrel of feed). The feed LHSV was 1.5 and was passed once through the reactor, i.e., no product recycle was employed. The reaction temperature was periodically adjusted so that a relatively constant conversion of the feed of 60 volume percent to products boiling below the initial boiling point of the feed was maintained. After a very few hours of operation so as to line the system out, it was found that the 60% conversion could be attained at a temperature of only 513° F., this temperature indicating a remarkably active catalyst even at a palladium level on the catalyst of only 0.03 weight percent. After 470 total hours on steam, the reaction temperature had only been raised to about 537° F. while still maintaining the 60% conversion, a temperature increase of only 24° F. The adjustments necessary in the reaction temperature gives rise to what is herein termed the fouling rate (FR) of the catalyst. It is apparent that the more rapid the rate that the reaction temperature must be increased to maintain the constant 60% conversion, the more rapid is the rate of undesirable catalyst fouling. It is normally desired to conduct the particular reaction at the lowest possible temperature (particularly when hydrocracking or hydrorefining), since the advantages to on-stream catalyst life, before regeneration or replacement of the catalyst is necessary, are apparent and of decided benefit. The lower the fouling rate, the better the catalyst insofar as maintaining catalyst activity is concerned.

The fouling rate FR can be expressed in terms of temperature and time. Since the reaction temperature rise was only 24° F. in 470 hours, the FR of Catalyst A was 0.05° F. per hour.

After a number of hours on-stream, Catalyst A was regenerated by a conventional oxidation procedure and its activity index again determined. It possessed an index above 20, indicating the catalyst was easily regenerable with a resulting high activity.

Example 2 (Catalysts B, BB)

A platinum catalyst was prepared in the same manner as described in Example 1 except that chloroplatinic acid was employed instead of the palladium compound and the amounts of components employed were somewhat different. The catalyst, after calcining at 1000° F., had a composition (in weight percent) of 20% alumina, 0.25% platinum (calculated as the metal), with the remainder silica.

A portion of this catalyst was then reduced and sulfided in the manner described in Example 1 and this portion of catalyst (Catalyst B) was given the activity index test and found to have an activity index of 8.0 and the product aniline point was 105° F.

The other portion of the calcined catalyst was thermactivated by heating in air at 1400° F. for two hours. This portion was then reduced and sulfided in the same manner. This catalyst (Catalyst BB) was found to have an activity index of 17.3 and the product aniline point was only 106.5° F. This example points up the advantage in activity to be gained by thermactivation. Catalyst BB had almost triple the activity of nonthermactivated Catalyst B even though their compositions were identical. Further, it can be seen that this activity advantage was gained without any appreciable sacrifice in product aniline point. Thus, activity was greately increased while still limiting the amount of excessive hydrogenation of the aromatic hydrocarbons.

Example 3 (Catalyst C)

Another platinum catalyst was prepared as described in Examples 1 and 2, the calcined composite having a composition (in weight percent) of 20% alumina, 0.05% platinum (again calculated as the metal), with the remainder silica. After reduction and sulfiding, the catalyst was found to have a tested activity index of 27.2 and a product aniline point of 125° F.

Example 4 (Catalyst D)

A palladium catalyst was prepared in the same manner as in Example 1 except the calcined composite had a composition (in weight percent) of 0.02% palladium (calculated as the metal), 12% alumina and slightly less than 88% silica. After reduction and sulfiding, the catalyst was tested. After 50 hours on-stream in the activity index test, the catalyst had an activity index of 23.2 and the product aniline point was 125° F.

Example 5

Nine additional catalysts of varying palladium level, Catalysts E–M, inclusive, were made in the manner described in Example 1. They were all tested and their activity indices and product aniline points determined in the manner described above. All of the catalysts contained 20 weight percent alumina with the remainder silica. The catalyst metal levels and the test results are summarized in Table II, together with the corresponding information about Catalysts A–D, inclusive.

TABLE 1

| Catalyst | Pd or Pt, wt. percent | Activity | Aniline pt., °F. |
|---|---|---|---|
| A (Pd) | 0.03 | >§28 | ~124 |
| B (Pt) | 0.025 | 8.0 | 105 |
| BB (Pt) | 0.025 | 17.3 | 106.5 |
| C (Pt) | 0.05 | 27.2 | 125 |
| D (Pd) | 0.02 | 23.2 | 129 |
| E (Pd) | 2.0 | 29.2 | 135 |
| F (Pd) | 0.5 | 33.8 | 151 |
| G (Pd) | 0.18 | 30.6 | 113 |
| H (Pd) | 0.10 | 19.3 | 129 |
| I (Pd) | 0.05 | 36.5 | 113 |
| J (Pd) | 0.02 | 23.2 | 126 |
| K (Pd) | 0.018 | 20.4 | 118° |
| L (Pd) | 0.01 | 7.9 | 105 |
| M (Pd) | 0.005 | 3.1 | 98 |

From the above results, and those shown in the previous examples, it can be seen that very active catalysts can be prepared containing over 0.01 and less than 0.05 weight percent platinum and/or palladium. It can also be seen that the catalyst activities of some of these catalysts are even higher than catalysts containing noble metal levels well above 0.05%, for example, see Catalysts E (2.0%) and H (0.10%). In addition to the high activities attainable, it must be noted that the catalysts within the scope of the present invention produce products having much lower aniline points than the higher metal level catalysts. Thus, the desirable feature of low hydrogen consumption is apparent since the lower aniline points show that excessive hydrogenation of aromatic hydrocarbons is considerably reduced. For example, Catalyst I, with a palladium level of only about 0.05 weight percent, had a much higher activity and a lower aniline point than Catalyst E which had a palladium level of 2.0 weight percent.

In order to show that the low noble metal level catalyst of the present invention, prepared by simultaneous cogelation or coprecipitation of the hydrogenating and cracking components, is superior to a catalyst of the same composition prepared by impregnation of the cracking component with the hydrogenating component, the following two catalysts were made and tested.

(1) Catalyst N: Cogelled catalyst containing 20 weight percent alumina and 0.025 weight percent platinum, with the remainder silica.

(2) Catalyst O: Impregnated catalyst of exactly the same composition as Catalyst N.

Example 6.—Preparation and testing of cogelled Catalyst N

Preparation of Solution I: 378.8 grams of $AlCl_3 \cdot 6H_2O$ were dissolved in 456 ml. of $CH_3OH$ and 100 ml. $H_2O$. 1188 ml. of $SiO_4(C_3H_5)_4$ (tetraethyl orthosilicate) were added slowly to the solution so prepared, followed by the further addition of 300 ml. of $H_2O$, resulting in Solution I.

Preparation of Solution II: 0.26 gram of $H_2PtCl_6 \cdot 6H_2O$ was dissolved in 20 ml. of $H_2O$, resulting in Solution II.

Preparation of Solution III: One-half of Solution I was combined with one-half of Solution II, resulting in Solution III.

Solution III was chilled to ice temperature, and combined with 260 ml. propylene oxide. The resulting mixture set up to a hydrogel in about 3 minutes. The hydrogel was dried at 250° F. for about 48 hours, then calcined for 1 hour at 400° F., for 1 hour at 600° F., for 1 hour at 800° F., and finally for 3 hours at 1050° F.

The resulting catalyst contained 20 weight percent alumina and 0.025 weight percent platinum, with the remainder silica.

65 ml. of the resulting catalyst, sulfided as in Example 1 and screened to 8–14 mesh, were tested to determine the activity index thereof and the aniline point of the test product. The test was made as in Example 1, except that the feedstock used was a light cycle oil having the following inspections.

TABLE III.—INSPECTIONS OF CYCLE OIL TEST SAMPLE

| | |
|---|---:|
| Gravity, °API | 30.1 |
| Aniline point, °F. | 131.2 |
| Sulfur, weight percent | 0.0012 |
| Total nitrogen, p.p.m. | 0.3 |
| Aromatics, vol. percent | 21.7 |
| Naphthenes, vol. percent | 67.9 |
| Paraffins, vol. percent | 10.4 |

ASTM Distillation (D-1160), °F.:

| | |
|---|---:|
| Start | 393 |
| 5% | 425 |
| 10% | 435 |
| 30% | 477 |
| 50% | 516 |
| 70% | 565 |
| 90% | 634 |
| 95% | 667 |
| End point | 740 |

The activity index of Catalyst N, and the product aniline point, determined by the test, were found to be 7.5 and 137.2, respectively.

Example 7.—Preparation and testing of impregnated Catalyst O

The remaining half of Solution I in Example 6 was chilled to ice temperature and combined with 260 ml. propylene oxide. The resulting mixture set up to a hydrogel in about 3 minutes. The hydrogel was dried and calcined exactly as in Example 6.

The resulting calcined composite was impregnated with the remaining half of Solution II in Example 6. The impregnated catalyst was dried in an oven for several hours, then recalcined at 1100° F. for two hours before testing.

65 ml. of the resulting catalyst, sulfided as in Example 1 and screened to 8–14 mesh, were tested as in Example 6, using the feedstock used in Example 6, to determine the activity index thereof and the aniline point of the test product. The activity index and product aniline point were found to be 5.3 and 139, respectively.

The results of Examples 6 and 7 are summarized as follows:

TABLE IV

| Catalyst | Pt, wt. percent | Activity index | Aniline pt., °F. |
|---|---|---|---|
| N (cogel) | 0.025 | 7.5 | 137.2 |
| O (impregnated) | 0.025 | 5.3 | 139 |

CONCLUSIONS

From Table IV it may be seen that, although the product aniline point in each case was similar, the activity index of the cogelled catalyst is substantially higher than that of the impregnated catalyst. From Table III it may be seen that with noble metal levels of 0.05 weight percent and above, the product aniline point is higher than with lower noble metal levels. From the two tables together it may be seen that the combination of cogelation with low noble metal level is critical to selectivity of the catalyst for hydrocracking a given feedstock to products of desired boiling range without excessive saturation of aromatics. An aromatic feedstock can be converted to products in a lower boiling range, for example the gasoline boiling range, by a combination of: (1) hydrogenation of the valuable octane number-influencing aromatic compounds contained therein, which hydrogenation reduces the feed gravity and boiling range, and (2) cracking the feedstock. The desirable objective is to convert the feedstock to products in the desired boiling range to a maximum extent by cracking, and to a minimum extent by hydrogenation of the valuable aromatics. The catalyst of the present invention exhibits this selectivity. The cogelled or impregnated catalysts with noble metal levels of 0.05 weight percent and above exhibit excessive hydrogenation activity, i.e., they result in converting the feedstock to a product in the desired boiling range too largely as a result of hydrogenating valuable aromatics, and too little as a result of cracking. The impregnated catalyst with a noble metal level below 0.05 weight percent or above does not excessively saturate aromatics, but does not have a desirably high cracking activity as reflected by the catalyst activity index. It is only the catalyst of the present invention, that is, one having a low noble metal content and that is prepared by cogelation or coprecipitation of the cracking and hydrogenating components, that has a superior cracking activity coupled with a superior ability to conserve valuable aromatics. Stated otherwise: (1) the impregnated or cogelled catalyst having a noble metal level of 0.5 weight percent or above cannot produce a product in a given boiling range from a given feedstock having as high an aromatic content as can the catalyst of the present invention; and (2) the impregnated catalyst having a noble metal level below 0.05 weight percent does not have the ability of the catalyst of the present invention to crack a given feedstock into products of a desired boiling range. More briefly, only the catalyst of the present invention results in as high a ratio of cracking activity/hydrogenation activity when converting a given feedstock to products of a given boiling range. This catalyst not only is extremely selective but its lower noble metal level makes it less costly, and the processes in which it is used can operate with lower hydrogen consumption than can processes using other forms of catalysts.

As has been indicated above, the catalyst of the present invention is suitable for catalyzing a number of different reactions, but it finds particular use in the hydrocracking of petroleum distillates or fractions, preferably those containing at least 10 volume percent and more preferably at least 20 volume percent, of aromatic compounds. When employed as the catalyst in the latter type reaction, the process can be conducted under any conditions of temperature, pressure, feed composition (including feed boiling ranges of from about 300° to over 1000° F. as well as containing those compounds in the feed that foul the catalyst) and feed rate. However, it is preferred to conduct the process at temperatures below about 850° F., and at elevated pressures of from about 300 to 3000 p.s.i.g. Even more preferably, the hydrocracking process is conducted such that hydrocarbon distillates having a total nitrogen content of less than about 200 p.p.m. (parts per million), and even more preferably, below about 10 p.p.m., along with a least 1000 s.c.f. of hydrogen per barrel of feed, are contacted with the platinum and/or palladium catalyst of the present invention. The contacting step in the hydrocracking zone is preferably effected at hydrogen partial pressures of 100 p.s.i.g. or more and at reaction temperatures below about 700° F.

Although only certain specific embodiments of the catalyst of the present invention have been disclosed herein, all variations of those specific embodiments that fall within the scope of the appended claims are intended to be embraced thereby.

What is claimed is:
1. A hydrocracking catalyst comprising:
   (1) a hydrogenating component
      (a) selected from the group consisting of platinum, platinum sulfide, palladium and palladium sulfide,
      (b) present in said catalyst in an amount over 0.01 weight percent and below 0.05 weight percent, based on the entire catalyst, and
   (2) a cracking component
      (a) having a high cracking activity,

(b) containing silica in an amount from 50 to 90 weight percent, based on the entire catalyst,
(c) having a surface area determined by forming said cracking component in the presence of said hydrogenating component.

2. A catalyst as in claim 1 having a surface area determined by forming said cracking component in the presence of said hydrogenating component by cogelation of said components.

3. A catalyst as in claim 1 having a surface area determined by forming said cracking component in the presence of said hydrogenating component by coprecipitation of said components.

4. A catalyst as in claim 1 wherein said cracking component comprises a molecular sieve.

5. A catalyst as in claim 1 comprising a fluoride.

References Cited
UNITED STATES PATENTS

| | | | |
|---|---|---|---|
| 2,849,378 | 8/1958 | Baker et al. | 252—453 X |
| 3,169,107 | 2/1965 | Coonradt et al. | 208—111 |
| 3,173,854 | 3/1965 | Eastwood et al. | 208—111 |
| 3,193,491 | 7/1965 | Cramer et al. | 252—452 X |
| 3,248,318 | 4/1966 | White | 252—453 X |
| 3,287,252 | 11/1966 | Young | 208—111 X |

DANIEL E. WYMAN, Primary Examiner

C. F. DEES, Assistant Examiner

U.S. Cl. X.R.

252—442, 452, 455, 460

PO-1050
(5/69)

UNITED STATES PATENT OFFICE
CERTIFICATE OF CORRECTION

Patent No. 3,535,270      Dated October 20, 1970

Inventor(s) BERNARD F. MULASKEY

It is certified that error appears in the above-identified patent and that said Letters Patent are hereby corrected as shown below:

Col. 7, line 23, "0.25%" should read --0.025%--.

Signed and sealed this 20th day of July 1971.

(SEAL)
Attest:

EDWARD M. FLETCHER, JR.
Attesting Officer

WILLIAM E. SCHUYLER, JR.
Commissioner of Patents